United States Patent
Dohmen

(10) Patent No.: US 9,394,023 B2
(45) Date of Patent: Jul. 19, 2016

(54) MOTORCYCLE SEAT BENCH

(75) Inventor: Christoph Dohmen, Wassenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/090,718

(22) Filed: Apr. 20, 2011

(65) Prior Publication Data

US 2011/0193375 A1 Aug. 11, 2011

Related U.S. Application Data

(63) Continuation of application No. PCT/EP2010/000114, filed on Jan. 13, 2010.

(30) Foreign Application Priority Data

Jan. 20, 2009 (DE) .......................... 10 2009 005 325

(51) Int. Cl.
*B62J 1/12* (2006.01)
*B62J 1/02* (2006.01)

(52) U.S. Cl.
CPC ..... *B62J 1/12* (2013.01); *B62J 1/02* (2013.01)

(58) Field of Classification Search
CPC ...................................... B62J 1/12; B62J 1/02
USPC .......... 180/219; 297/195.1, 301.1–302.6, 199
See application file for complete search history.

(56) References Cited

U.S. PATENT DOCUMENTS

| | | | |
|---|---|---|---|
| 4,029,284 A | 6/1977 | Swenson | |
| 4,632,355 A | 12/1986 | Thomas | |
| 4,765,432 A | 8/1988 | Odom | |
| 5,611,557 A * | 3/1997 | Farris et al. | 280/275 |
| 6,616,117 B2 * | 9/2003 | Gryp et al. | 248/588 |
| 7,431,261 B2 * | 10/2008 | Irish et al. | 248/566 |
| 2007/0102411 A1 | 5/2007 | Takano | |

FOREIGN PATENT DOCUMENTS

| | | |
|---|---|---|
| DE | 27 06 835 A1 | 9/1977 |
| DE | 197 19 965 A1 | 11/1997 |
| DE | 202 10 280 U1 | 10/2002 |
| DE | 102 53 452 A1 | 5/2004 |
| DE | 10 2004 054 325 B3 | 4/2006 |
| DE | 10 2005 055 921 A1 | 5/2007 |
| JP | 4-254272 A | 9/1992 |

OTHER PUBLICATIONS

International Search Report dated Apr. 7, 2010 with English translation (four (4) pages).
German Office Action dated Sep. 25, 2009 with English translation (eight (8) pages).

* cited by examiner

*Primary Examiner* — Tony Winner
*Assistant Examiner* — Marlon Arce
(74) *Attorney, Agent, or Firm* — Crowell & Moring LLP

(57) ABSTRACT

A motorcycle seat is provided, the seat being aligned in the longitudinal direction of the motorcycle and having a spring-damper system under the seat surface that absorbs and reduces impacts and vibrations of the motorcycle on the rider or passenger. The seat may include regulating/control electronics that adjust the damper of the spring-damper system to the present riding situation in conjunction with a sensor placed near the front wheel. The spring-damper system is arranged between a seat top plate and a seat floor plate or in the level of one of the two seat plates.

18 Claims, 5 Drawing Sheets

MOTORCYCLE SEAT BENCH

CROSS-REFERENCE TO RELATED APPLICATIONS

This application is a continuation of PCT International Application No. PCT/EP2010/000114, filed Jan. 13, 2010, which claims priority under 35 U.S.C. §119 from German Patent Application No. DE 10 2009 005 325.5, filed Jan. 20, 2009, the entire disclosures of which are herein expressly incorporated by reference.

BACKGROUND AND SUMMARY OF THE INVENTION

The invention relates to a motorcycle seat aligned in the longitudinal direction of the vehicle, a spring-and-damper system being arranged underneath the seat surface and absorbing and reducing shocks and vibrations from the vehicle to the motorcyclist or passenger, as well as to a process for damping a motorcycle seat aligned in the longitudinal direction of the vehicle.

Motorcycle seats, especially motorcycle seats for sports-type or touring-type motorcycles, consist of an ergonomic seat body made of different foamed materials. In addition to guiding the pelvis in the longitudinal direction, these seat bodies have the purpose of softening vibrations and shocks acting upon the motorcyclist from the road by way of the vehicle. Depending on the model, such seats may also be called a "seat bench". However, because, in contrast to 4-wheel motor vehicles, the ratio of the weight of the vehicle to that of the motorcyclist is much larger, this task cannot be accomplished in the same manner as in the case of 4-wheel motor vehicles by using this foamed material layer usually having a thickness of 5 to 20 centimeters. This results in above-average stress on the motorcyclist's back during the drive, and therefore, in addition to the health risks, in a loss of comfort during longer motorcycle trips.

For increasing the driving comfort, German Patent Document DE 102005055921 A1 provides a special selection of the foamed material and of the foamed-material covering in order to avoid any heat accumulation in the seat area by means of improving the air circulation. German Patent Documents DE 10253452 1A and DE 19719965 C2 attempt to eliminate this nuisance by changing the contour of the seat surface by means of lever mechanisms or by way of air cushions that can be filled with compressed air.

These approaches can improve the static sitting comfort but do not influence the intensity of vibrations and shocks transmitted from the road to the vehicle operator and/or the passenger.

It is therefore an object of the invention to create a motorcycle seat aligned in the longitudinal direction of the vehicle which improves the sitting comfort particularly with respect to vibrations and shocks transmitted to the motorcyclist and/or passenger from the road.

According to the invention, this object is achieved by a motorcycle seat and a process as discussed below.

The forces acting upon the chassis of the vehicle are thereby measured very early by a sensor placed near the front wheel axle, and the forces to be expected at the seat bottom plate are determined ahead of time from the measured values of the sensor. As a result of the phase shift of the vehicle chassis, a force or acceleration measured at the front wheel, depending on the speed of the vehicle, will act upon the motorcycle seat only at a later point in time.

Since the motorcycle seat or a motorcycle seat bench is arranged close to the rear-wheel axle, some time may pass between an impact occurring at the front wheel and a damping required at the seat bench before the damping at the seat bench is acted upon. For example, when the front wheel drives over a branch, a damping at the seat will make sense and become necessary only when the rear wheel has arrived at the branch. The damping at the seat can therefore be optimally adjusted before the rear wheel rolls over the branch. It is thereby ensured, on the one hand, that the damping only acts upon the motorcycle seat bench precisely at the right point in time and, on the other hand, slower damping systems can also be used because a little more time will be left for optimally adjusting the damping before the impact on the rear wheel.

While the electronic regulating/control system makes it possible to optimally adapt the damping of the motorcycle bench to the forces induced by any unevenness of the road, the spring-and-damper system between a seat top plate and a seat bottom plate permits a simple installation of the motorcycle seat bench in the case of conventional motorcycles without intervening in the basic construction of the vehicle body. In particular, by adding this further spring-and-damper system without intervention in the safety-relevant spring-and-damper system of the vehicle, the driving comfort is improved at low expenditures with respect to the stress on the motorcyclist induced by any unevenness of the road.

In the case of German Patent Document DE 27 06 835 A1, no electronic regulating/control system is provided that has a sensor placed close to the front wheel axle, and the spring-and-damper system is not arranged between a seat top plate and a seat bottom plate.

U.S. Patent Document U.S. Pat. No. 4,632,355 A shows a motorcycle seat bench having a spring-and-damper system. However, here the spring-and-damper system is not arranged under the seat surface of the motorcycle seat bench.

German Patent Document DE 202 10 280 U1 describes no motorcycle seat bench aligned in the driving direction. However, it also shows a spring-and-damper system which absorbs and reduces shocks and vibrations from the vehicle to the motorcyclist. The electronic control system described by the example of the bicycle absorbs shocks acting upon the handle bar fork in that a sensor is placed close to the front wheel axle, and a sensor is placed close to the rear wheel axle for shocks acting upon the saddle. The teaching of the citation demonstrates that wherever a damping has to take place, an additional sensor has to be arranged even if, in that case, for a bicycle, one sensor has to be provided for the fork and one has to be provided for the saddle.

The construction according to the invention results in a reduction of required parts, such as sensors and electronic control components. The construction according to the invention makes it possible to react in an anticipatory fashion. This means that the sensor receives a signal at an early point in time and guides this signal to the electronic control system which then—preferably coordinated with the speed of the motorcycle—adjusts the damper in a time-staggered manner.

According to the invention, a spring-and-damper system is situated between the seat surface and the vehicle, which spring-and-damper system partially mutually insulates the vehicle and the motorcyclist with respect to vibrations and shocks corresponding to its spring mounting and damping characteristics.

By adding this further spring-and-damper system in the motorcycle seat bench, without an intervention in the safety-relevant damper system of the vehicle, the driving comfort can be improved at low cost with respect to the stress on the motorcyclist induced by any unevenness of the road.

At least one damper is constructed to be adjustable in its damping effect and is adjusted by way of an electronic regulating/control system supplied with data by differently placed sensors corresponding to present driving situations. A sensor placed close to the front wheel axle, preferably along the line of action of the vibrations and shocks acting from the road upon the vehicle, measures the imminent stress acting upon the motorcyclist and/or passenger, preferably as acceleration, before the phase shift through the chassis of the vehicle. This sensor makes it possible for the electronic regulating/control system to determine ahead of time a force that will act upon the underside of the seat in the future in order to adjust the damper to the imminent stress in a precise manner with respect to the time. In this case, the propagation time of the excitation can be determined from the continuous comparison of the signal of the sensor situated close to the front wheel axle and of the signal of a sensor on the underside of the seat. As an alternative, the signal propagation time can be determined from the characteristic curves of the chassis of the vehicle and of the actual speed (for example, by way of the tacho signal or data of a vehicle bus system). In this case, additional sensors can determine the accelerations on the seat top side and underside, the tilt of the vehicle as well as the actual deflection of the springs and of the damper. As an alternative, the acceleration acting upon the top side of the seat can be determined from the acceleration acting upon the underside of the seat and from the change of the deflection of the springs and of the damper. In an advantageous embodiment, the electronic regulating/control system supplied with voltage by the electrical system of the vehicle determines an ideal damping intensity from the obtained sensor values by means of stored data tables. Another embodiment for determining the value of the optimal damping provides the numerical solution of the differential equations of the two-mass oscillating body (excitation road—spring-and-damper system vehicle—mass vehicle—spring-and-damper system motorcycle seat—mass motorcyclist/passenger).

A third embodiment provides the determination of the ideal damping by means of simple algorithms which evaluate different driving situations and determine the required damping intensity. Also conceivable is a separate analysis of the sensor values with respect to the primarily existing vibration fraction, the examination of the sensor values with respect to individual events, such as potholes or road finishing/roughing edges, the checking for acceleration/braking/tilting and the triggering of the damper as a function of the residual spring travel of the seat bench.

A conceivable process for triggering the damper as a function of the residual spring travel of the seat bench increases the damper force starting from a certain deflection defined by a parameter from the center position and a movement which enlarges the deflection. In this case, the acceleration measured by the sensor placed close to the front wheel axle and to be expected at the underside of the seat, together with the accelerations applied to the seat underside and seat top side, can be utilized for adjusting the required damper force change optimally to the existing residual spring travel.

A conceivable process for a general road analysis reduces the damper force when the excitation frequency is within a selected range. By means of the excitation to be expected on the underside of the seat, the damper force can be adjusted for this purpose to an amount that optimally utilizes the spring travel of the system.

A conceivable process for the damping of shocks of individual events, such as potholes or road finishing/roughing edges, detects such an individual event by the exceeding of a limit acceleration for a certain duration, and reduces the damping force for a defined duration. As an alternative, the duration of the damping force reduction can be determined from the acceleration values measured at the underside of the seat or at the underside and top side of the seat. In a preferred embodiment, the point in time of the reduction of the damper force is determined from the propagation time of the excitation from the road to the underside of the seat.

The various processes can be differently prioritized within a continuously run program according to their importance with respect to the vibration and shock reduction of the top side of the seat. In addition, the comparison parameters, by means of which the algorithms determine the required damping force, can be designed to be variable. In a preferred embodiment, the automatic change of the comparison parameters is to be provided as a function of the selected chassis characteristics in the case of vehicles with variable chassis characteristics.

In a preferred embodiment, the electronic regulating/control system is to be capable of being updated in order to be able to carry out changes or improvements of the control at a later point in time, and/or to be able to comply with a motorcyclist's special wishes.

The spring-and-damper system, consisting of at least one spring and at least one damper, is arranged between a seat top plate and a seat bottom plate which, in an advantageous arrangement, are mutually connected by way of a scissors lift. As a result, the upper part of the seat bench is provided with good lateral stability despite the springing. In an expedient embodiment, fastening possibilities for the at least one spring and the at least one damper are provided on the underside of the seat top plate and on the upper side of the seat bottom plate. The upper side of the top plate of the seat is expediently ergonomically molded but has at least one fastening possibility for an ergonomically shaped seat surface. The underside of the seat bottom plate preferably provides a fastening possibility on a supporting surface fixed to the vehicle. In a conceivable embodiment, the damper is connected directly with the seat bottom plate and the seat top plate. A further possibility provides the installation of the damper in the plane of one of the two seat plates (seat top plate or seat bottom plate). In this case, the damper connects the corresponding seat plate with the part of the scissors lift that is free-running in the plane.

As an alternative, it is provided that the spring-and-damper system is placed in a closed module of a height as low as possible, which can only be moved in the vertical direction and permits the installation into series-produced seat benches.

The seat top plate and the seat bottom plate are preferably constructed as a molded part. In a further conceivable construction, the seat top plate and the seat bottom plate are constructed as a tubular frame structure.

In a simple construction, the springs advantageously arranged between the seat top plate and the seat bottom plate can be prestressed by means of distance plates in order to adapt the spring effect to the motorcyclist's weight. In a more comfortable construction, this adaptation can take place by means of an adjusting mechanism for changing the spring travel.

A conceivable process for the damper triggering as a function of the residual spring travel of the seat bench increases the damper force starting from a certain deflection from the center position defined by a parameter and a movement which enlarges the deflection. In this case, the acceleration measured by the sensor placed close to the front wheel axle and to be expected at the underside of the seat, together with the accelerations applied to the seat underside and seat top side, can be utilized for adjusting the required damper force change optimally to the existing residual spring travel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
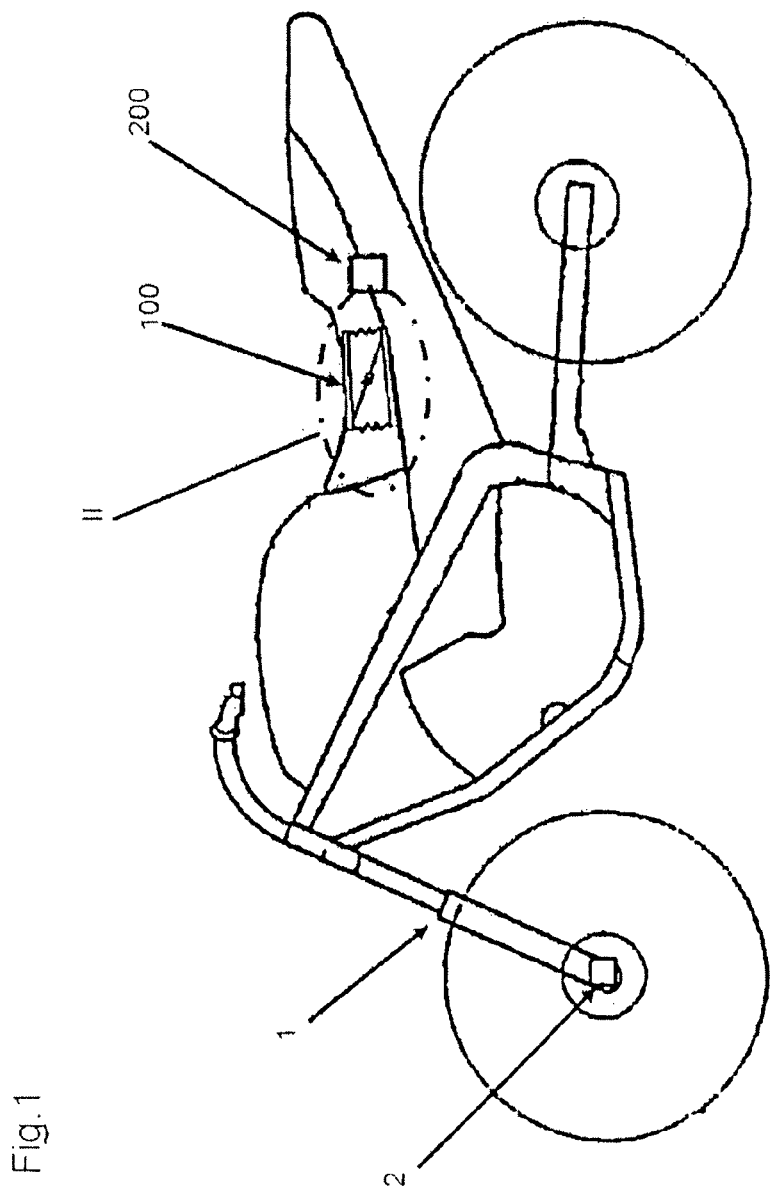
FIG. 1 is a view of a schematic representation of a motorcycle having a seat bench in accordance with an embodiment of the present invention.

The motorcycle in FIG. 1 has a conventional construction. Details unnecessary for the invention were therefore not described. Important in connection with the present invention are position of the mechanical system of the seat bench 100 described in detail in FIGS. 2 and 3, the presence of an electronic regulating/control system 200 arbitrarily placed in the vehicle, and the sensor 2 situated in front of the chassis of the vehicle along the line of action of the vibrations and shocks acting from the road upon the vehicle. Corresponding to the drawing, the effect of the mechanical system of the seat bench in this case is limited, for example, to the motorcyclist's seat.

Figure 2:
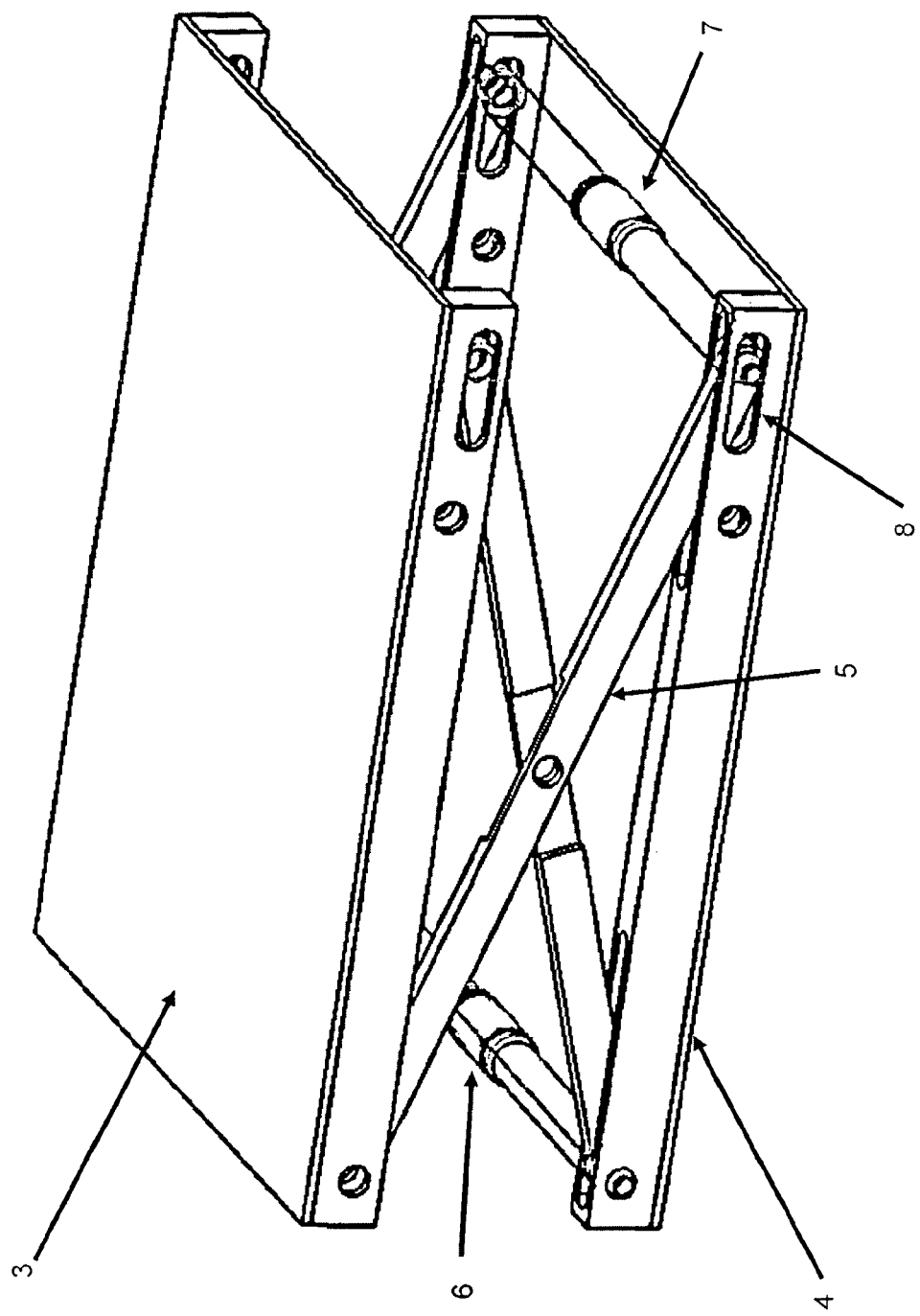
FIG. 2 is an enlarged perspective view of the cutout II shown in FIG. 1.

FIG. 2 illustrates the mechanical system of the seat bench with seat top plate 3, seat bottom plate 4 and a scissors lift 5 connecting the two plates. In this embodiment, a damper installation is provided in the plane of the seat bottom plate between a stationary point 6 of the seat bottom plate and a point 7 of the free-running part 8 of the scissors lift 5.

Figure 3:
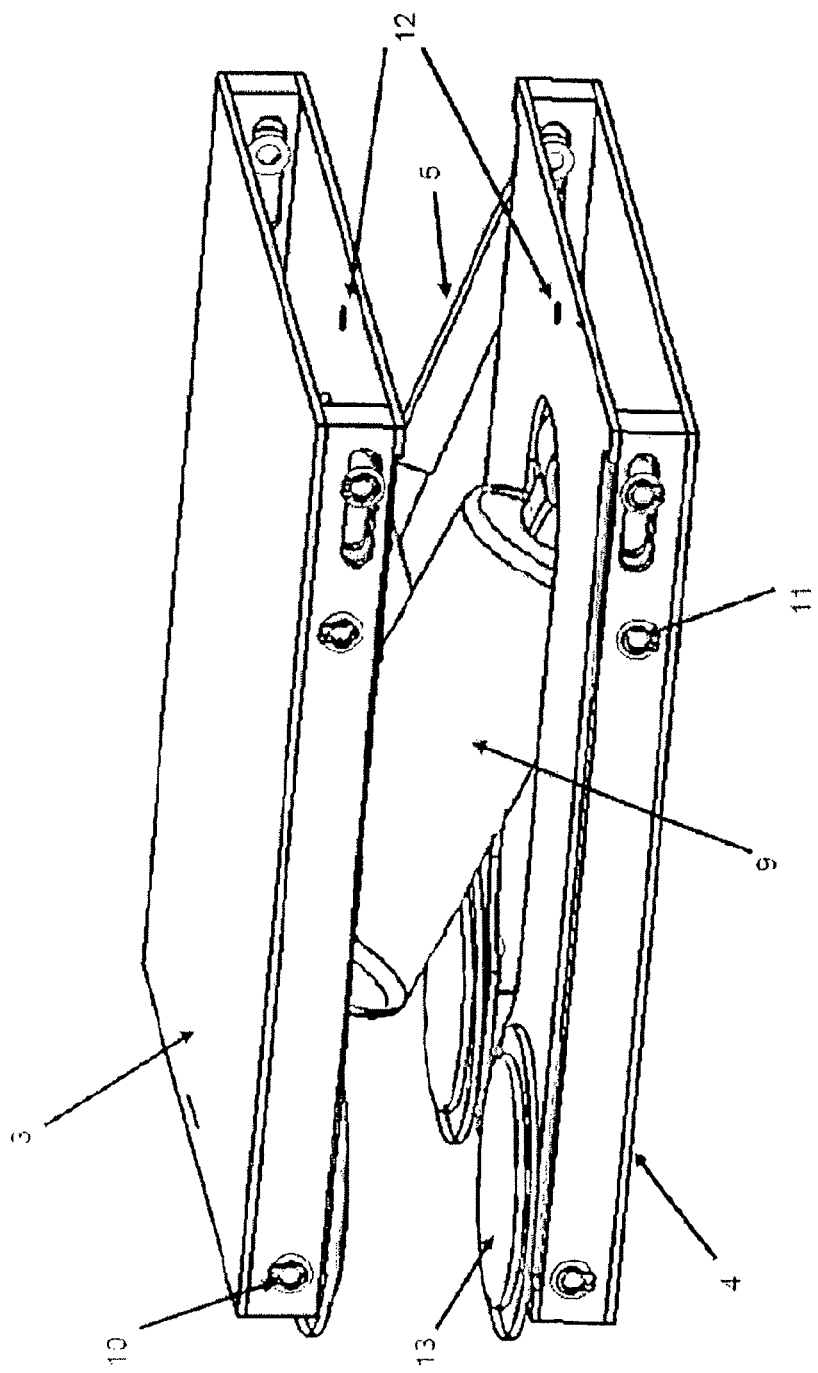
FIG. 3 is a perspective view of cutout II shown in FIG. 1, with additional details.

An alternative arrangement of the damper is illustrated in FIG. 3. By its line of action, the damper 9 illustrated here directly connects the seat bottom plate 4 with the seat top plate 3 by way of the stationary axes 10 and 11 assigned to the respective plates. In addition, FIG. 3 illustrates an expansion of the top plate 3 and bottom plate 4 of the seat. A simple possibility of receiving a possible spring retainer 13 illustrated in the left-hand part of the figure is provided in the right-hand part of the figure in the form of a hole 12. In this arrangement, which is shown as an example, three springs and one damper are used within the mechanical system of the motorcycle seat bench. For reasons of clarity, the forward linkage of the scissors lift 5 was not shown again in FIG. 3.

Figure 4:
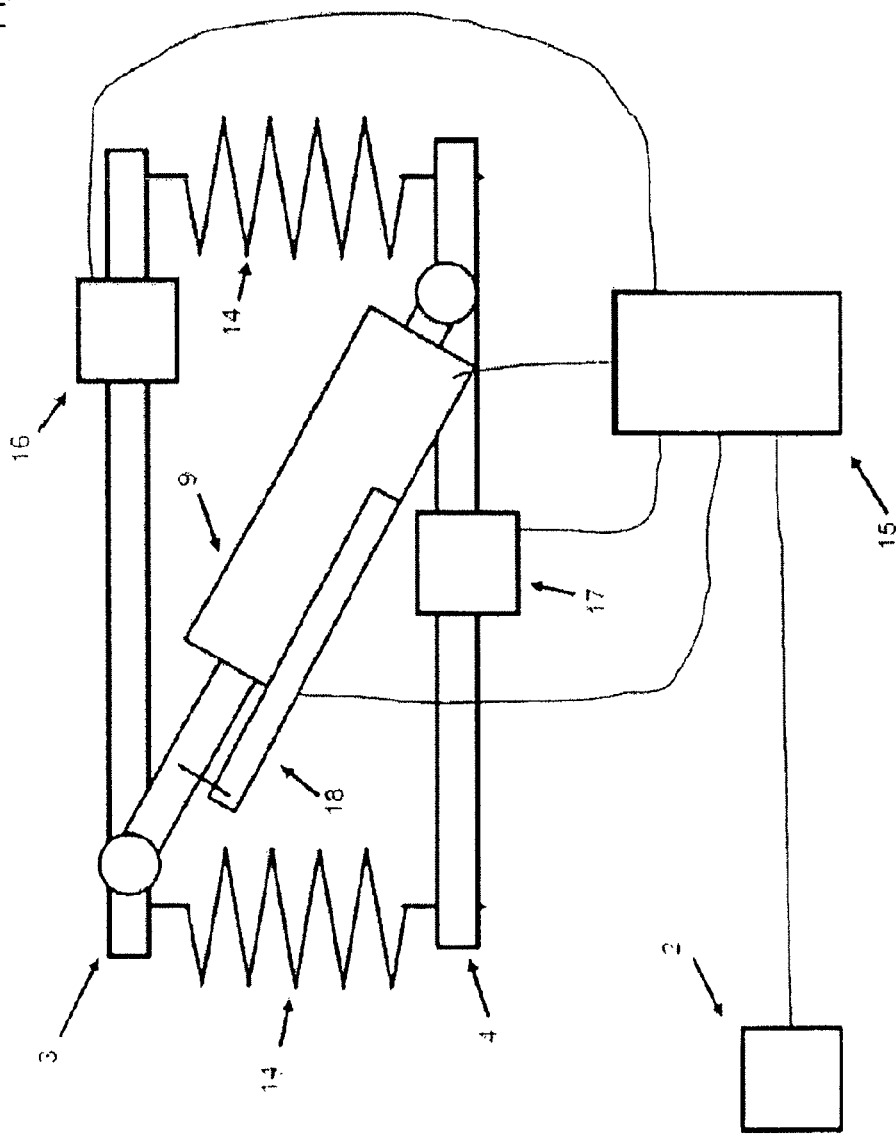
FIG. 4 is a schematic view of an embodiment of a motorcycle seat bench, including an electronic regulating/control system with its dependencies.
Figure 5:
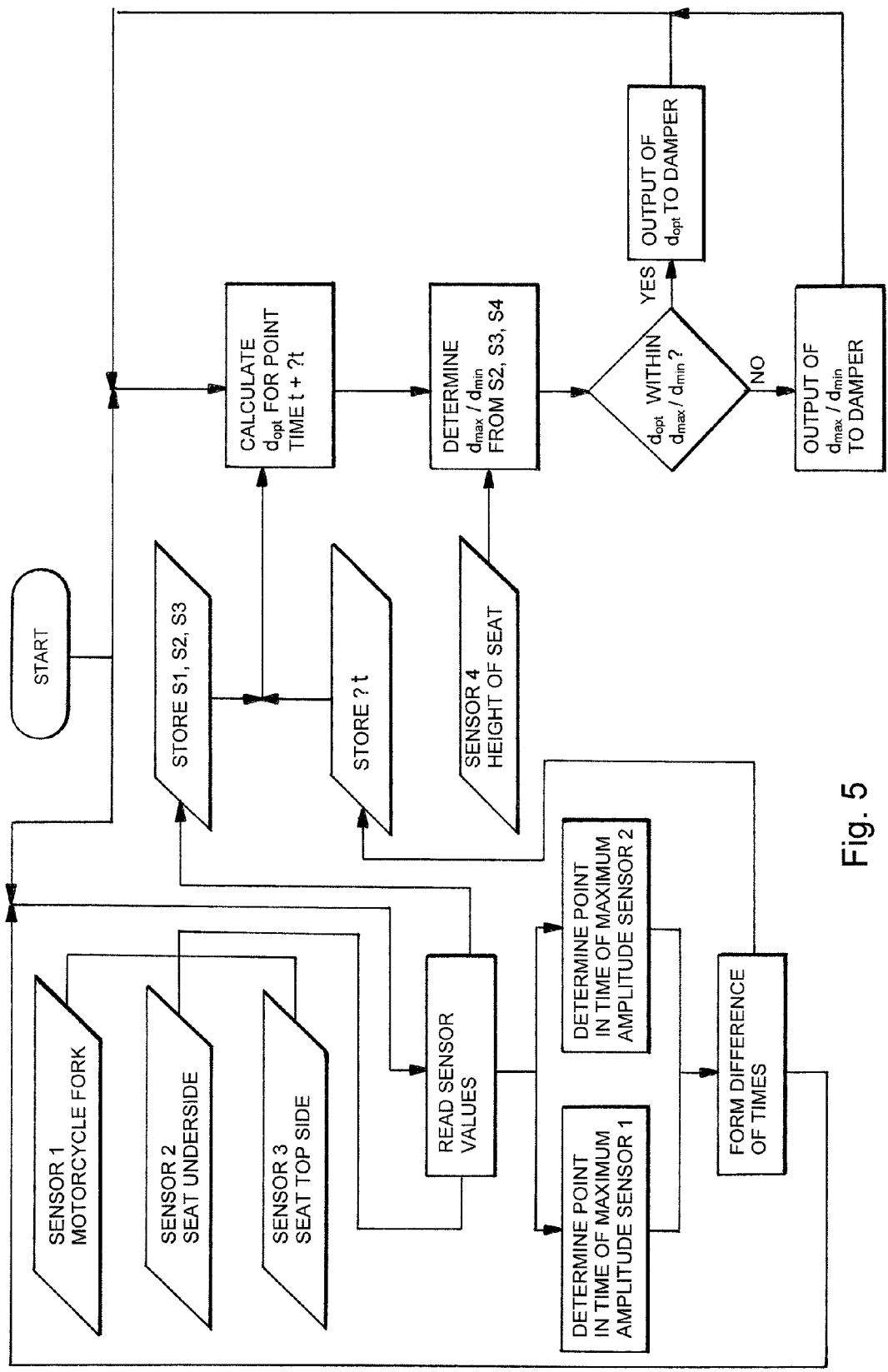
FIG. 5 is a flow chart for the driving-situation-dependent control of the adjustable damper in accordance with an embodiment of the present invention.

FIG. 4 shows a schematic interaction of the mechanical system of the motorcycle seat bench consisting of the seat top plate 3, the seat bottom plate 4, the damper 9 and the springs 14 with the electronic regulating/control system 14 and the sensor 2 placed close to the front wheel axle, the sensors at the underside and top side 16, 17 of the seat, and the sensor for measuring the seat deflection 18.

In addition to the sensor 2 already described in FIG. 1, which is situated in front of the chassis 1 of the vehicle along the line of action of the vibrations and shocks acting from the road upon the vehicle, this arrangement uses as an example also a sensor 16 for measuring the accelerations at the top plate 3 of the seat, a sensor 17 for measuring the accelerations at the bottom plate 4 of the seat, and a sensor 18 for measuring the seat deflection (height between the top plate 3 and bottom plate 4) of the seat at the damper 9.

In addition to being connected with the sensors 2, 16, 17, 18, the electronic regulating/control system 15 is connected with the power supply 19 of the motorcycle and the damper 9 whose damping effect can be adjusted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle seat system, comprising:
   a motorcycle seat configured to be aligned in a longitudinal direction of a vehicle when installed on the vehicle;
   a spring-and-damper system arranged underneath a surface of the seat to reduce motion being transferred from the vehicle to a vehicle occupant on the seat;
   a front wheel sensor located in the vicinity of a front wheel axle of the vehicle; and
   an electronic regulating/control system,
   wherein
      the spring-and-damper system is arranged between a top plate and a bottom plate of the seat or in a plane of one of the two seat plates,
      the spring-and-damper system is mechanically independent from a vehicle wheel suspension, and
      the electronic regulating/control system controls a damping of motion of the spring-and-damper system in response to signals from the front wheel sensor.

2. The motorcycle seat system according to claim 1, further comprising:
   at least one seat sensor measures at least one of a seat acceleration and a seat height,
   wherein the electronic regulating/control system controls the damper in response to signals from the at least one seat sensor.

3. The motorcycle seat system according to claim 1, wherein
   the front wheel sensor senses accelerations corresponding to forces acting upon the vehicle as a result of unevenness of a road surface.

4. The motorcycle seat system according to claim 1, wherein
   the electronic regulating/control system and the damper of the spring-and-damper system are supplied by an electrical system of the vehicle.

5. The motorcycle seat system according to claim 1, wherein
   the top plate and the bottom plate of the seat are mutually connected by way of a scissors lift.

6. The motorcycle seat system according to claim 5, wherein
   the seat top plate has connection points for springs and dampers on an underside of the seat top plate.

7. The motorcycle seat system according to claim 6, wherein
   the seat bottom plate has connection points for springs and dampers on a top side of the seat bottom plate.

8. The motorcycle seat system according to claim 7, wherein
the seat bottom plate has at least one connection point for a vehicle-fixed supporting surface on an underside of the seat bottom plate.

9. The motorcycle seat system according to claim 5, wherein
the damper directly connects the top plate and the bottom plate of the seat.

10. The motorcycle seat system according to claim 5, wherein
the damper connect the seat bottom plate and a part of a scissors lift running free in a plane of the seat bottom plate.

11. The motorcycle seat system according to claim 5, wherein
the damper connects the seat top plate and a part of a scissors lift running free in a plane of the seat top plate.

12. The motorcycle seat system according to claim 5, wherein
at least one spring connects the top plate and the bottom plate of the seat.

13. The motorcycle seat system according to claim 12, wherein
the length of the at least one spring is adjustable by an adjusting mechanism.

14. A method for damping a motorcycle seat aligned in the longitudinal direction of a vehicle, the motorcycle seat being a component of a motorcycle seat system which includes a spring-and-damper system arranged underneath a surface of the seat to reduce motion being transferred from the vehicle to a vehicle occupant on the seat, the spring-and-damper system being mechanically independent from a vehicle wheel suspension, a front wheel sensor located in the vicinity of a front wheel axle of the vehicle, and an electronic regulating/control system, comprising the acts of:
sensing force from unevenness of a road with the front wheel sensor;
sending signals corresponding to the road forces to the electronic regulating/control system;
determining forces to be expected at the seat bottom plate based on the front wheel sensor signals;
transmitting control signals from the electronic regulating/control system to the damper of the spring-and-damper system to adjust a damping force of the damper to reduce a motion perceived by an occupant of the vehicle by a time at which the force from unevenness of the road reaches the seat bottom plate.

15. The method according to claim 14, wherein
the damping force is increased as a displacement from an initial position increases.

16. The method according to claim 14, wherein
the electronic regulating/control system determines the damping force adjustment by reference to stored data tables.

17. The method of claim 14, wherein
the electronic regulating/control system determines the damping force adjustment by numerically solving differential equations describing a movement of the front wheel.

18. The method according to claim 14, wherein
the electronic regulating/control system determines the damping force adjustment by use of an algorithm.

* * * * *